United States Patent Office 3,383,773
Patented May 21, 1968

3,383,773
METHODS OF REPRODUCIBLY DRYING
ORGANOPOLYSILOXANES
Duane C. Nugent, Perrysburg, Ohio, assignor to Owens-Illinois, Inc., a corporation of Ohio
No Drawing. Filed Nov. 15, 1966, Ser. No. 594,381
17 Claims. (Cl. 34—9)

The present invention relates to methods of reproducibly drying organopolysiloxanes and, more particularly, to methods of drying precured prepolymers of organopolysiloxanes prepared from methyltrialkoxysilanes or mixtures thereof with phenyltrialkoxysilanes to thereby make reproducible solid powdered solvent-soluble prepolymers capable of being further cured to thermoset polymers.

In the past, it has not been possible to reproducibly make and dry solvent-soluble, thermoplastic precured prepolymers prepared by the acid-catalyzed hydrolysis and condensation of trifunctional silane monomers such as methyltriethoxysilane. Methods of drying the thermoplastic precured prepolymers from a solution thereof in ethyl alcohol, etc. such as freeze drying or casting and grinding have been tried, but such methods were generally slow, costly, difficult to adapt to large quantities, and did not make the solid powdered prepolymers in a manner that was reproducible as desired from a commercial standpoint.

It is an object of the present invention to provide a method of reproducibly making and drying a solvent soluble precured prepolymer of a trifunctional silane such as methyltriethoxysilane.

It is an object of the present invention to provide a method of drying in a reproducible manner a solvent soluble, precured prepolymer of methyltriethoxysilane to provide a powdered product that is capable of being further cured to a thermoset polymer.

It is an object of the present invention to provide a method of drying in a reproducible manner a solvent soluble, precured prepolymer of a mixture of methyltriethoxysilane and phenyltriethoxysilane to provide a powdered product that is capable of being further cured to a thermoset polymer.

These and other objects will become apparent from the specification that follows and the appended claims.

The present invention provides a method of reproducibly drying a solvent soluble precured prepolymer prepared from an acid-catalyzed hydrolysis and condensation of a trifunctional silane monomer that is preferably methyltriethoxysilane or a mixture thereof with phenyltriethoxysilane. The precured prepolymer is dissolved in a solvent such as methylene chloride, chloroform or acetone and spray dried by mixing the above-described solution with inlet spray dryer air having a volume of at least about 150 and preferably 160 cubic feet per pound of the feed solution. The air/solution mixture is spray dried to provide an outlet air temperature of no greater than about 115° F., and preferably about 90° to 110° F., the inlet air temperature generally being regulated to within a temperature range of about 115° to 120° up to about 150 or 155° F. to keep the outlet air temperature below its maximum of about 115° F.

The solution of precured prepolymer in methylene chloride or other solvent just prior to spray drying is generally about 35 or 40% up to about 60 to 65% by weight of the prepolymer, the preferred range being about 45 to 55% and the optimum being at about 50% by weight.

The precured prepolymer is mixed with hot inlet air and spray dried in a commercial spray drying unit such as a Nichols Engineering laboratory model spray dryer according to the process set forth in the following flowsheet:

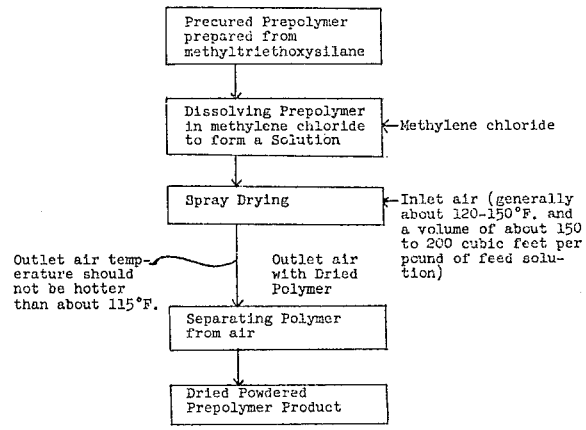

Suitable trifunctional silane starting materials to provide the precured prepolymers are methyltrialkoxysilanes or mixtures of methyltrialkoxysilanes and phenyltrialkoxysilanes in which the alkoxy group has 1 to 6 carbon atoms and preferably 2 carbon atoms.

It is preferred that the molar ratio of methoxytrialkoxysilanes to phenyltrialkoxysilanes in the above-described mixtures is about 2:1 although generally a ratio of about 1.5:1 to 2.5:1 can be used.

The precured prepolymers to be spray dried are prepared by:

I. Heating a mixture of
   A. A silane that is methyltrialkoxysilane, ethyltrialkoxysilane, or mixtures of methyltrialkoxysilane and phenyltrialkoxysilane in which the alkoxy radical contains from 1 to 6 carbon atoms;
   B. At least a trace of acid and at least about 1.5 moles of water for every mole of total silane present, at a temperature of from about 50° to about 80° C. for a period of time of from about 1 to about 10 hours;

II. Concentrating the liquid siloxane partial condensation product from Step I to remove some but not all volatile material including alkanol by-product and some water and to obtain a liquid residue; and III. Precuring the product of Step II at a temperature of from about slightly below, say 5° C., to as much as about 50° C. below the gel point of the resin for a period of time of from about 10 seconds to about 60 minutes, the 60 minutes requiring the lower temperatures.

As used here, the gel point is that temperature at which a 50 gram sample of prepolymer gels when placed in a 100 ml. beaker and stirred on a 600° F. hot plate.

The mixture of methyl and phenyl precured prepolymers is preferably made by

I. Heating a mixture of
   A. from about 1 to about 5 moles of methyltriethoxysilane and from about 5 to about 1 mole of phenyltriethoxysilane;
   B. from about 1.5 to about 3 moles of water for every mole of total silane present, there being less than 0.01 mole of acid present in the reaction mixture per mole of said silane introduced thereto at a temperature of about 80° C. for a period of time of from about 2 to about 6 hours;
thereafter, the mixture is further processed by II. Concentrating the liquid siloxane partial condensation product from step I by distilling at the reaction temperature until approximately 60–70% of the theoretical yield of ethanol is removed, thereby to remove some but not all volatile material including alkanol by-product and some water and to obtain a liquid residue with a viscosity of about 30 to 60 or 65 centipoises at 60% solids and 25° C.; and III. Precuring the product of step II by heating to a temperature of from about slightly below the gel point to about 30° C. below the gel point of the resin and holding this temperature for a period of time of from about 10 to about 120 seconds.

Step III above is preferably accomplished by a heating of a prepolymer having a predetermined gel point of about 175° to 210° C. at about 170° to about 190° or 195°.

The precured prepolymer from the methyltrialkoxysilane is generally prepared by a method that includes the steps of I. Heating a mixture of
  A. a methyltrialkoxysilane represented by the general formula

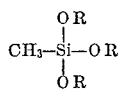

wherein R represents an alkyl radical containing less than 4 carbon atoms and from 0 to 5 mole percent, based on total silane reactant material, of at least one compound represented by the general formula

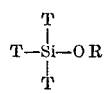

wherein R in the alkoxy radical —OR has the same meaning as in the first-given formula and each T independently represents an aryl, alkyl or alkenyl radical, each of which contains less than 7 carbon atoms, or the aforementioned alkoxy radical, —OR, and
  B. from 1.5 to about 10 moles of water per mole of total silane reactant material, said mixture containing by weight from 0 to 700 parts of acid, expressed as HCl, per million parts of total silane reactant material, said maximum of 700 parts of acid being the approximate upper limit when using a silane:water mole ratio of 1:1.5 and decreasing to a maximum of 1 weight part of acid, expressed as HCl, per mole of total silane reactant material when the silane:water mole ratio employed is 1:10, the heating of the said mixture to form a liquid siloxane partial condensation product being continued for from 1 to 10 hours at temperatures of at least 50° C. while retaining in said mixture at least 1.5 moles of alkanol by-product per mole of silane starting material assuming complete hydrolysis of all alkoxy-silicon linkages in the liquid reaction mixture;

II. Concentrating the liquid siloxane partial condensation product from Step I by gradually raising its temperature above its initial reaction temperature to a maximum temperature within the range of from 100° to 300° C. thereby to remove some but not all volatile material including alkanol by-product and some water and to obtain a liquid residue; and III. Precuring the concentrated liquid siloxane partial condensation product from Step II by heating it at a temperature slightly below its gelation point, and within the range of from 110° to 300° C., to remove the remainder of the volatile material and to obtain, without gelation, a more highly condensed, organic-solvent soluble, siloxane partial condensation product that is capable of being finally cured to a solid organopolysiloxane resin.

The precured prepolymer from the methyltrialkoxysilane is preferably prepared as follows:

I. Heating a mixture of
  A. methyltriethoxysilane; and
  B. from 1.5 to about 10 moles of water per mole of total silane reactant material, said mixture containing by weight from 0 to 700 parts of acid, expressed as HCl, per million parts of total silane reactant material, said maximum of 700 parts of acid being the approximate upper limit when using a silane:water mole ratio of 1:1.5 and decreasing to a maximum of 1 weight part of acid, expressed as HCl, per mole of total silane reactant material when the silane:water mole ratio employed is 1:10, at a temperature of about 80° C. for a period of time of from about 2 to about 6 hours;

II. Concentrating the liquid siloxane partial condensation product from Step I by distilling at the reaction temperature until approximately 60 percent of the theoretical yield of ethanol is removed, thereby to remove some but not all volatile material including alkanol by-product and some water and to obtain a liquid residue having a viscosity of about 15 or 20 up to about 30 to 35 centipoises at 50% solids and 25° C.; and III. Precuring the product of Step II by slowly heating to a temperature of from about 10° to about 20° C. below the gel point of the resin and holding this temperature momentarily.

The optimum method of making the precured prepolymer from methyltrialkoxysilane comprises the steps of
(a) reacting methyltriethoxysilane at a temperature of about 80° C. in water using about 2½ moles of water per mole of said silane by refluxing said silane and water for at least about one hour in the presence of about 3 parts of HCl per million parts of said silane and water,
(b) concentrating the refluxed material at about 100° to 300° C.,
(c) heating the resultant concentrated material to a temperature of about 140° C. momentarily or for a few seconds to precure the same, and thus prepare the prepolymer for its subsequent solution in a solvent such as methylene chloride.

The following examples are intended to illustrate the present invention and not to limit the same:

EXAMPLE 1

An organopolysiloxane prepolymer was prepared from methyltriethoxysilane and phenyltriethoxysilane, using 2 moles of the methyl silane to 1 mole of the phenyl silane. The mixture of methyl and phenyl triethoxysilanes was hydrolyzed and condensed with 9 moles of water and 2.5 parts of HCl per million parts of water and silane, the silanes first being purified by distillation to about zero p.p.m. of HCl.

The reaction mixture was heated with agitation in a flask equipped with a condenser until the pot temperature reached 80° C. This temperature was maintained for four hours. After about 20 minutes, the two-phase reaction mixture clarified to a one-phase system due to the ethanol liberated in the reaction acting as a mutual solvent. At the end of the four-hour period, approximately 282 g. of an ethanol-water mixture (about 92% alcohol) was removed by distillation. The hydrolysis and condensation reaction and concentration thereafter produced a viscous liquid.

The viscous liquid was then transferred to a beaker and heated with stirring to 140° C. and held at this temperature momentarily. This temperature was slightly below the gel point which had been predetermined to be about 170° C. During this reaction procedure, there was a large increase in viscosity.

The prepolymer was thus precured to advance the condensation to a point where the polymer is tack free at room temperature, but still thermoplastic and capable of being cured to a thermoset polymer. The precuring step just mentioned was accomplished by heating a 60% by weight solids solution of the prepolymer in a 4000 ml. beaker with stirring on a hot plate. When the prepolymer solution reached the temperature of 140° C., the solution was removed from the hot plate and poured into methylene chloride. The resultant mixture was agitated until all the precured prepolymer was dissolved to provide a 50% by weight solution of the precured prepolymer in methylene chloride.

The resultant 50% by weight solution of precured prepolymer was spray dried in a spray dryer operating with heated air. The dryer exit temperature was 110° F. and the inlet air volume was 175 cubic feet per pound of feed solution, the inlet air temperature being adjusted to 130° F. to provide the solvent free spray dried product at the exit air temperature of 110° F.

The spray dried precured prepolymer was collected from the exit air stream with a cyclone separator, an auxiliary dust collector being used to recover any product still remaining from the exit air.

The above-described process provides a powdered product that is quite reproducible as compared to prior methods of producing a powdered product such as casting and grinding.

EXAMPLE 2

A precured prepolymer was prepared as described in Example 1 and dissolved in methylene chloride to provide a 50% by weight solution thereof in the methylene chloride. Prior to spray drying, silica was added to the solution with mixing to proxide a slurry thereof. The resultant slurry was fed into the spray dryer as described in Example 1.

An excellent silica-filled product is obtained, there being 50 parts by weight of silica per 100 parts by weight of the polymer in the final product.

In the above example, an organopolysiloxane prepared from methyltriethoxysilane as previously described can be substituted for the particular organopolysiloxane employed in the example to provide substantially equivalent results. Other organopolysiloxanes, previously described as being suitable for use in the present invention, can be used to replace the particular organopolysiloxane in the above example to provide nearly equivalent results.

Also in the above examples, other solvents such as chloroform and acetone can be substituted for all or part of the methylene chloride to provide substantially equivalent results.

As previously indicated, other inlet air temperatures for the spray dryer can be used in the range of about 115° to 120° F. up to as high as about 150° to 155° F. providing that the exit air temperature is not more than about 115° F. and the inlet air volume is at least about 150 cubic feet per pound of feed solution.

Other fillers such as finely divided talc, mica, boron nitride, powdered metals, ground glass, titanium dioxide, etc. and carbon can be used in place of all or part of the silica to provide nearly equivalent results.

As was previously indicated, the spray drying can be accomplished by suitable atomizing means such as a centrifugal high speed disc atomizer. The atomizing can also be accomplished in a pneumatic atomizing nozzle by use of a relatively high pressure air stream at a pressure of, say, about 60 to 100 p.s.i. Such spraying and atomizing of the feed solution must be such that the temperature of the polymer is kept at least several degrees and preferably at least about 3 to 5° C. below its softening point, which in the case of the polymer of Example 1, was about 50° C.

It is to be understood that various modifications of the invention herein described may be made without departing from the spirit and scope thereof.

What is claimed is:
1. A method of preparing a solid powdered organopolysiloxane in a reproducible manner, the method comprising the steps of:
 (A) heating a mixture of
  (1) a silane which is a member of the group consisting of methyltrialkoxysilane and a mixture of methyltrialkoxysilane and phenyltrialkoxysilane in which the alkoxy group contains 1 to 6 carbon atoms;
  (2) at least a trace of acid and at least about 1.5 moles of water for every mole of total silane present, at a temperature of from about 50° to about 80° C. for a period of time of from about 1 to about 10 hours;
 (B) concentrating the liquid siloxane partial condensation product from Step A to remove some but not all volatile material including alkanol by-product and some water and to obtain a liquid residue;
 (C) precuring the product of Step B below the gel point of the resin for about 1 second to 1 minute;
 (D) dissolving the precured prepolymer of Step C in a volatile solvent; and
 (E) mixing the solution of Step D with inlet air having a volume of at least about 150 cubic feet per pound of the solution of Step D;
 (F) spray drying the solution of Step D with said inlet air having a temperature in the range of about 120° to 150° F. to provide an outlet air temperature of no more than about 115° F.; and
 (G) recovering the spray dried prepolymer to thereby reproducibly prepare a powdered prepolymer product.

2. A method as described in claim 1 in which the silane is a mixture of about 2 parts by weight of methyltrialkoxysilane and 1 part of phenyltrialkoxysilane.

3. A method as described in claim 1 in which the silane is methyltrialkoxysilane.

4. A method as defined in claim 1 in which the solvent is methylene chloride.

5. A method as defined in claim 1 in which the solvent is chloroform.

6. A method as defined in claim 1 in which the solvent is acetone.

7. A method as defined in claim 1 in which the solution of Step D contains about 40 to 60 percent by weight of the precured prepolymer.

8. A method as defined in claim 7 in which the inlet air of Step E has a volume of about 150 to 200 cubic feet per pound of the solution of Step D.

9. A method as defined in claim 8 in which the outlet air of the spray drying Step F has a temperature of about 90° to 115° F.

10. A method as defined in claim 9 in which the silane is a mixture of about 2 parts by weight of methyltriethoxysilane and 1 part by weight of phenyltriethoxysilane.

11. A method as defined in claim 9 in which the silane is methyltriethoxysilane.

12. A method of making a reproducible powdered product, the method comprising the steps of:
 (A) hydrolyzing and condensing a mixture of about 1½ to 2 moles of methyltriethoxysilane and 1 mole of phenyltriethoxysilane with about 3 moles of water per mole of silane and about 2.5 parts of an acid catalyst per million parts of silane and water;
 (B) concentrating the liquid siloxane partial condensation product by distilling at the reaction temperature until about 60% by weight of the theoretical yield of ethanol is removed, to thereby remove ethanol by-product and some water to obtain a liquid concentrated product;
 (C) precuring the concentrated product at about 140° C. to obtain a precured prepolymer;
 (D) dissolving the precured prepolymer in methylene chloride to obtain about a 50% solution;

(E) mixing the solution of Step D with inlet air having a volume of about 175 cubic feet per pound of solution of Step D;

(F) spray drying the solution of Step D with said inlet air having a temperature in the range of about 120° to 150° F. to provide an outlet air temperature of about 110° F.; and (G) recovering the spray dried precured prepolymer.

13. A method as defined in claim 12 in which 2 moles of methyltriethoxysilane is used per each mole of phenyltriethoxysilane and the acid catalyst is HCl.

14. A method of making a reproducible powdered product, the method comprising the steps of:

(A) hydrolyzing and condensing one mole of methyltriethoxysilane with about 2.5 moles of water and about 3 parts of an acid catalyst per million parts of silane and water;

(B) concentrating the liquid siloxane partial condensation product by distilling at the reaction temperature until about 60% by weight of the theoretical yield of ethanol is removed, to thereby remove ethanol by-product and some water to obtain a liquid concentrated product;

(C) precuring the concentrated product at about 140° C. to obtain a precured prepolymer;

(D) dissolving the precured prepolymer in methylene chloride to obtain about a 50% solution;

(E) mixing the solution of Step D with inlet air having a volume of about 175 cubic feet per pound of solution of Step D;

(F) spray drying the solution of Step D with said inlet air having a temperature in the range of about 120° to 150° F. to provide an outlet air temperature of about 110° F.; and (G) recovering the spray dried precured prepolymer.

15. A method as described in claim 1 in which a filler is mixed with the solution of Step D before spray drying to provide a final product having the filler dispersed therewithin.

16. A method as described in claim 15 in which the filler is finely divided and about 30 to 70 parts by weight of the filler is used per 100 parts by weight of the solution of Step D.

17. A method as described in claim 16 in which the filler is silica.

References Cited

UNITED STATES PATENTS

| | | | |
|---|---|---|---|
| 2,445,572 | 7/1948 | Gerould et al. | 34—9 |
| 3,275,549 | 9/1966 | Crabb | 34—9 X |
| 3,290,790 | 12/1966 | Kunii et al. | 34—9 |

FREDERICK L. MATTESON, JR., *Primary Examiner.*

J. J. CAMBY, *Assistant Examiner.*